US010587739B2

(12) United States Patent
Ormsbee et al.

(10) Patent No.: US 10,587,739 B2
(45) Date of Patent: Mar. 10, 2020

(54) SYSTEMS AND METHODS FOR AN ADJUSTABLE ELECTRONIC DEVICE HOLDER

(71) Applicants: Bowden Ormsbee, Longmont, CO (US); Rex Stevens, Longmont, CO (US)

(72) Inventors: Bowden Ormsbee, Longmont, CO (US); Rex Stevens, Longmont, CO (US)

(73) Assignee: Nite Ize, Inc., Boulder, CO (US)

( * ) Notice: Subject to any disclaimer, the term of this patent is extended or adjusted under 35 U.S.C. 154(b) by 0 days.

(21) Appl. No.: 16/163,110

(22) Filed: Oct. 17, 2018

(65) Prior Publication Data

US 2019/0052740 A1 Feb. 14, 2019

Related U.S. Application Data

(63) Continuation of application No. PCT/US2017/027946, filed on Apr. 17, 2017.
(Continued)

(51) Int. Cl.
*H04M 1/04* (2006.01)
*B60R 11/02* (2006.01)
(Continued)

(52) U.S. Cl.
CPC .............. *H04M 1/04* (2013.01); *B60R 11/02* (2013.01); *B60R 11/0241* (2013.01);
(Continued)

(58) Field of Classification Search
CPC ......... H04M 1/04; F16M 11/04; F16M 13/02; F16M 13/00; F16M 2200/022
(Continued)

(56) References Cited

U.S. PATENT DOCUMENTS 5,305,381 A * 4/1994 Wang .................. B60R 11/0241
379/426
5,457,745 A * 10/1995 Wang .................. B60R 11/0241
379/426
(Continued)

OTHER PUBLICATIONS

International Search Report and Written Opinion dated Jun. 27, 2017 issued in corresponding PCT App. No. PCT/US2017/027946 (15 pages).
(Continued)

*Primary Examiner* — Melur Ramakrishnaiah
(74) *Attorney, Agent, or Firm* — Haynes and Boone, LLP (57) ABSTRACT

A system for holding an electronic device includes a body portion, the body portion having a flat surface. The system further includes a first holding piece and a second holding piece, each of the first and second holding pieces including a holding surface approximately perpendicular to the flat surface. The system further includes an arm interconnected with the first holding piece, the arm extending into an aperture in the body portion, the body portion including a mechanism for holding the arm in a first fixed position such that there is a first distance between the first and second holding pieces, the mechanism further providing for orientation of the arm in a second fixed position such that there is a second distance between the first and second holding pieces, the second distance less than the first, the first and second holding pieces being complementarily shaped to hold the electronic device.

24 Claims, 9 Drawing Sheets

Related U.S. Application Data (60) Provisional application No. 62/324,146, filed on Apr. 18, 2016.

(51) Int. Cl.
   *F16M 11/04* (2006.01)
   *F16M 13/02* (2006.01)
   *F16M 13/00* (2006.01)
   *B60R 11/00* (2006.01)

(52) U.S. Cl.
   CPC .......... *F16M 11/041* (2013.01); *F16M 13/00* (2013.01); *F16M 13/022* (2013.01); *B60R 2011/0057* (2013.01); *B60R 2011/0071* (2013.01)

(58) Field of Classification Search
   USPC ....... 379/454; 361/679.5; 248/316.4, 346.04, 248/346.07, 450; 403/108, 109.3
   See application file for complete search history.

(56) References Cited

U.S. PATENT DOCUMENTS

| | | | |
|---|---|---|---|
| 10,226,117 B1* | 3/2019 | Baxter | A45F 5/02 |
| 2009/0294617 A1 | 12/2009 | Stacey et al. | |
| 2011/0290975 A1* | 12/2011 | Lin | F16M 11/28 |
| | | | 248/346.04 |
| 2012/0305733 A1 | 12/2012 | Vogel et al. | |
| 2013/0146632 A1 | 6/2013 | Lai | |
| 2013/0206945 A1 | 8/2013 | Chen et al. | |
| 2014/0168890 A1* | 6/2014 | Barnard | G06F 1/1626 |
| | | | 361/679.55 |

OTHER PUBLICATIONS

European Search Report dated Sep. 30, 2019 issued in parallel European Patent App. No. 17786416.2 (11 pages).

* cited by examiner

FIG. 9

SYSTEMS AND METHODS FOR AN ADJUSTABLE ELECTRONIC DEVICE HOLDER

CROSS REFERENCE TO RELATED APPLICATION

This application is a continuation of International Application No. PCT/US2017/027946 filed Apr. 17, 2017 which claims the benefit of U.S. Provisional Patent Application 62/324,146 filed Apr. 18, 2016, and hereby incorporated by reference to the same extent as though fully disclosed herein.

BACKGROUND

The use of electronic devices such as smart phones is ubiquitous by consumers. Users take smart phones everywhere with them and are constantly on the body of people everywhere. At times, however, it is desirable to mount a smart phone (or other electronic device) in a hands free holder or other configuration that does not require the user to hold the smart phone. Throughout this disclosure, the term "smart phone" will be used; however, other devices such as tablets or any other electronic device also may be used with the systems described herein. Although solutions are available, it is desirable to have a holder that can firmly hold a variety of sizes of electronic devices and quickly release the same electronic device.

BRIEF SUMMARY

In one embodiment, a system for holding an electronic device includes a body portion, the body portion having a flat surface. The system further includes a first holding piece and a second holding piece, each of the first and second holding pieces including a holding surface approximately perpendicular to the flat surface. The system further includes an arm interconnected with the first holding piece, the arm extending into an aperture in the body portion, the body portion including a mechanism for holding the arm in a first fixed position such that there is a first distance between the first and second holding pieces, the mechanism further providing for orientation of the arm in a second fixed position such that there is a second distance between the first and second holding pieces, the second distance less than the first, the first and second holding pieces being complementarily shaped to hold the electronic device. Optionally, the mechanism includes a quick release lever, the quick release lever holding the arm in the second fixed position; and when the quick release lever is depressed, the mechanism releases the arm to the first fixed position. In one alternative, the system further includes an arm end, the arm end on an end of the first arm, the arm end including a first geared portion, the first geared portion positioned to mate with a second geared portion of the quick release lever. Alternatively, the system further includes a spring arm, the spring arm oriented against the quick release lever, holding the second geared portion of the quick release lever against the first geared portion of the arm end, the quick release lever pivotally mounted on the body portion such that, when a user pushes on the quick release lever, the quick release lever releases away from the first geared portion and allows the quick release lever to move. Optionally, the system further includes a gear mounted on the body portion; and a spring interconnected with the body portion and the gear, the gear interacting with a third geared portion of the arm end such that, when the arm is pushed towards the body portion, the gear rotates, gathering rotational energy in the spring, and the quick release lever pushes against the spring arm, momentarily releasing the first geared portion from the second geared portion, allowing the quick release lever to ratchet. In one alternative, the system includes a second arm, the second arm including a second arm end, the second arm end interacting with the gear with a fourth geared portion of the second arm end. In another alternative, the arm end and the second arm end each include an aperture complementary to receive a third arm and a fourth arm, such that the third arm slides into the aperture of the first arm end and the fourth arm slides into the aperture of the second arm end. Optionally, each of the first and second holding pieces includes a piece of high friction material that compresses and provides friction to the electronic device when the electronic device is held. In one configuration, the system further includes a magnetic holder attached to the body piece. Optionally, the magnetic holder includes a magnetic ring formed to complementarily fit to the shape of a semicircular receiver. Alternatively, the magnetic holder further includes a first piece of high friction material formed around the magnetic ring. In one alternative, the magnetic holder further includes a first piece of high friction material formed in the center of the magnetic ring. In another alternative, the first, second, third, and fourth arms slide in and out of the body portion in a fixed plane.

In one embodiment, a system for holding an electronic device includes a body portion, the body portion having a flat surface. The system further includes a first holding piece and a second holding piece, each of the first and second holding pieces including a holding surface approximately perpendicular to the flat surface. The system further includes a first arm interconnected with the first holding piece and a second arm interconnected with the second holding piece, the first and second arms extending into apertures in the body portion, the body portion including a mechanism for holding the first and second arms in a first fixed position such that there is a first distance between the first and second holding pieces, the mechanism further providing for orientation of the first and second arms in a second fixed position such that there is a second distance between the first and second holding pieces, the second distance less than the first, the first and second holding pieces being complementarily shaped to hold the electronic device. Optionally, the mechanism includes a quick release lever, the quick release lever holding the first and second arms in the second fixed position, and when the quick release lever is depressed, the mechanism releases the first and second arms to the first fixed position. In one alternative, the system includes a first arm end and a second arm end, the first arm end on an end of the first arm, the second arm end on an end of the second arm, each of the first and second arm ends including a first geared portion and a second geared portion respectively, the first geared portion positioned to mate with a second geared portion of the quick release lever. In another alternative, the system includes a spring arm, the spring arm oriented against the quick release lever, holding the second geared portion of the quick release lever against the first geared portion of the first arm end, the quick release lever pivotally mounted on the body portion such that, when a user pushes on the quick release lever, the quick release lever releases away from the first geared portion and allows the quick release lever to move. In yet another alternative, the system includes a gear mounted on the body portion; and a spring interconnected with the body portion and the gear, the gear interacting with a third geared portion of the first arm end and a fourth geared portion of the second arm end such that, when the first and second arms are pushed toward the body portion, the gear rotates, gathering rotational energy in the spring, and the quick release lever pushes against the spring arm, momentarily releasing the first geared portion from the second geared portion, allowing the quick release lever to ratchet. Optionally, the first arm end and the second arm end each include an aperture complementary to receive a third arm and a fourth arm, such that the third arm slides into the aperture of the first arm end and the fourth arm slides into the aperture of the second arm end. Alternatively, each of the first and second holding pieces includes a piece of high friction material that compresses and provides friction to the electronic device when the electronic device is held. Optionally, the system further includes a magnetic holder attached to the body piece, and the magnetic holder includes a magnetic ring, formed to complementarily fit to the shape of a semicircular receiver. In one alternative, the magnetic holder further includes a first piece of high friction material formed around the magnetic ring and a second piece of high friction material formed in the center of the magnetic ring. Optionally, the first, second, third, and fourth arms slide in and out of the body portion in a fixed plane.

DETAILED DESCRIPTION

Certain terminology is used herein for convenience only and is not to be taken as a limitation on the embodiments of the systems and methods for an adjustable electronic device holder with quick release functions. In the drawings, the same reference numbers are employed for designating the same elements throughout the several figures.

Figure 1:
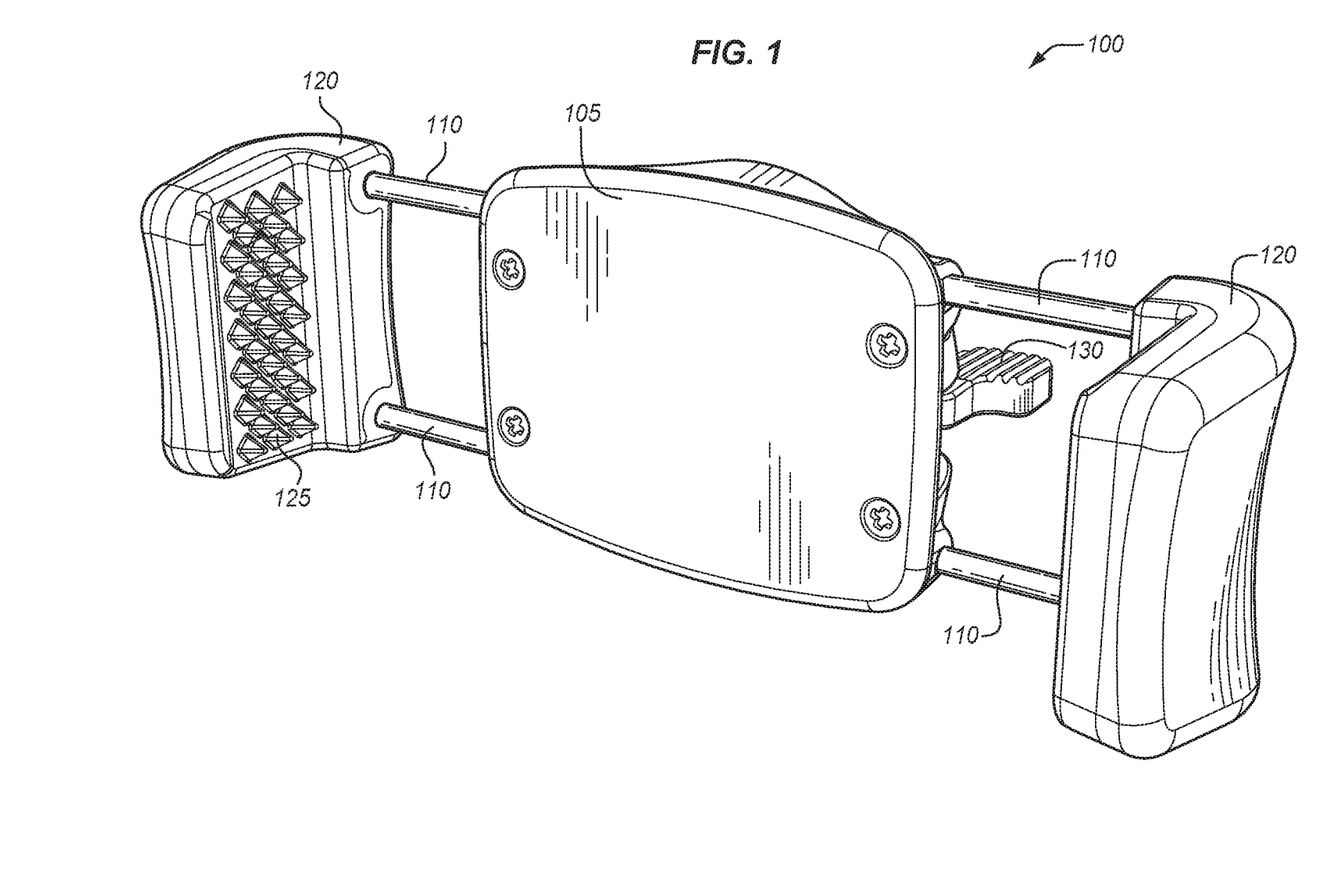
FIG. 1 show a front perspective view of one embodiment of an adjustable electronic device holder with quick release functions.

FIG. 1 show a front perspective view of one embodiment of an adjustable electronic device holder with quick release functions 100 (AEDH 100). Generally, AEDH 100 includes a central housing 105. Central housing 105 includes adjustment, ratcheting, and locking mechanisms to provide for the adjustment of the AEDH 100 to hold different-sized electronic devices. From central housing 105, one or more arms 110 extend. In the embodiment shown, four arms 110 are included. At the end of each set of two arms 110, holding piece 120 is included. Holding piece 120 serves to hold and press against a smart phone placed between the holding pieces 120 when they are ratcheted towards each other into a holding arrangement. As mentioned, one or more arms 110 may be included as part of the AEDH 100. In some embodiments, a single arm 110 may be included. In such an embodiment, one of the holding pieces 120 may be fixed, while the other holding piece 120 may be attached to a single arm 110 and may ratchet in and out. For stability purposes as well as strength of holding the electronic device, the embodiment show in FIG. 1 may be desirable. Generally, arms 110 interact with a ratcheting system housed in central housing 105, as will be explained. Additionally, as shown, each holding piece 120 may include a gripping area 125. The gripping area 125 generally is composed of a compressible material. Gripping area 125 may be contoured as shown or in various other fashions, which increase the compressibility of the material while also increasing the friction offered by the material. Gripping area 125 may be a TPR (thermoplastic rubber) 40 SHORE A overmold. Gripping area 125 may be a TPR (thermoplastic rubber) from 5 to 100 SHORE A overmold. Alternatively, silicon, rubber, and other materials may be used.

FIG. 1 shows quick release lever 130 as well. When lever 130 is actuated, the arms 110 are released by the ratcheting mechanism housed in central housing 105 and a smart phone held by the holding pieces 120 may be removed.

Figure 2:
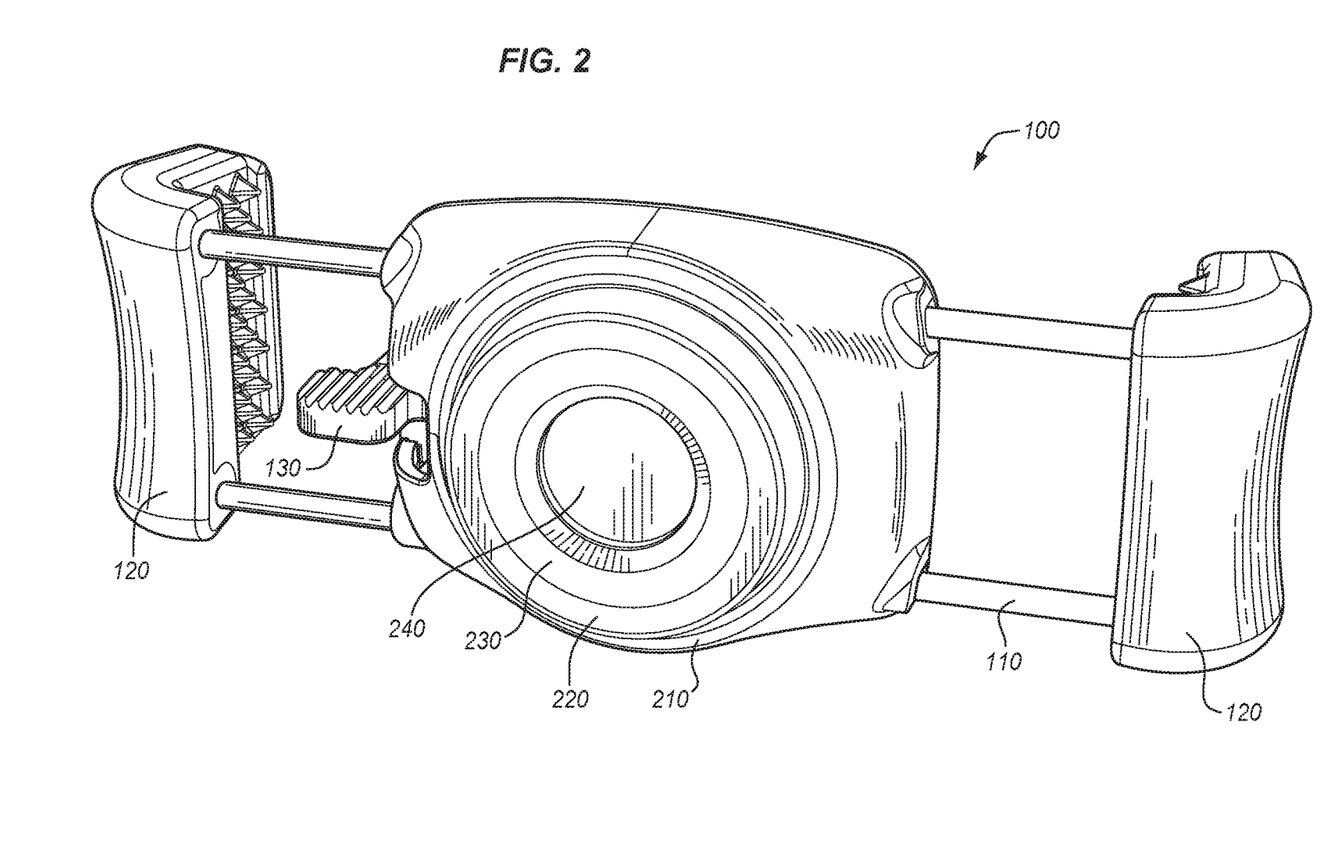
FIG. 2 shows a rear perspective view of the adjustable electronic device holder with quick release functions of FIG. 1.

FIG. 2 shows a rear perspective view of AEDH 100. In this view, a magnetic attachment mechanism 210 is shown. In alternative embodiments, other attachment mechanisms may be utilized. In the embodiment shown, magnetic attachment mechanism 210 includes an outer high friction ring 220, a magnetic ring 230, and an inner high friction surface 240. Magnetic attachment mechanism 210 is designed to attach to a rounded surface having magnetic characteristics. In many configurations, a spherical or semi-spherical mount is provided to which the AEDH 100 may complementarily connect. The spherical or semi-spherical mount may be attached to a stand or other connector for connecting or standing on a table, car dashboard, or other location. Optionally, magnetic attachment mechanism 210 may be attached to any magnetic surface. In some alternatives, a different attachment mechanism may be mounted on the back of the AEDH 100, including clamps, clips, or other attachment mechanisms.

Figure 3:
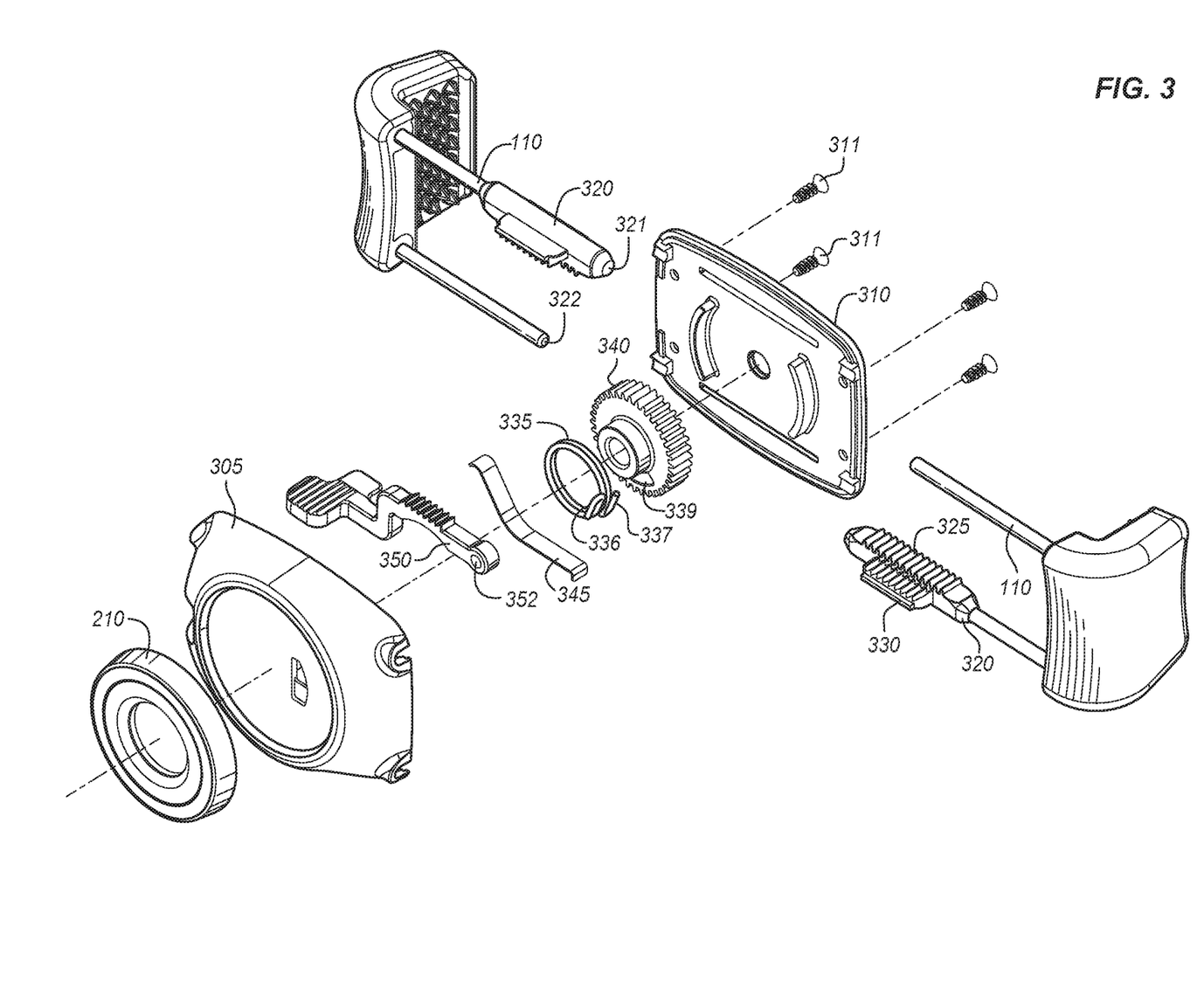
FIG. 3 shows an exploded view of the adjustable electronic device holder with quick release functions of FIG. 1.

FIG. 3 shows an exploded view of the AEDH 100. Here, many of the inner workings that provide for ratcheting and locking are visible. The central housing 105 includes a front body piece 310 and a rear body piece 305. Quick release lever 350 (AKA 130) is shown. Quick release lever 350 has an aperture 352 that fits on a peg in rear body piece 305. Quick release lever 350 also includes a geared section 351 that interacts with the geared section 330 of arm end 320. In operation, this interaction prevents the arms from moving in an outwards fashion until the quick release lever is depressed. This spring arm 345 fits into a slot in rear body piece 305 and applies pressure to quick release lever 350, such that it does not release until depressed by the user. Spring 335 interfaces with rear body piece 305 and gear 340. The tip 336 of spring 335 interfaces with rear body piece 305. The other tip 337 of spring 335 interfaces with aperture 339 of gear 340. As a user presses the arms 110 and holding pieces 120 together, the gear sections 325 of arm ends 320 interact with gear 340. This turns gear 340, causing the spring 335 to hold the energy from the turning. Typically, this also causes arms 110 and holding pieces 120 to hold the smart phone placed between them. As noted above, quick release lever 350 interacts with geared section 330 and prevents the gear 340 from turning in the opposite direction until the quick release lever 350 is depressed. When the arms 110 and holding pieces 120 are pushed together, the quick release lever 350 will "ratchet," in that the force applied by the user will flex spring arm 345, allowing gear 340 to turn clockwise (according to the view of FIG. 3). Counterclockwise movement may be permitted by depressing the quick release lever 350, which will release the stored energy of the spring 340 and cause the arms 110 and holding pieces 120 to release outwards away from the central housing 105. Although the description herein is oriented to using two arms, the system may use only one arm; in this case, the top arm that interacts with quick release lever 350. Additionally, one or more one-armed or two-armed systems may be combined as well as systems utilizing one fixed side.

Also shown in FIG. 3 are screws 311 which hold the central housing 105 together. Additionally, each of the arm ends 320 includes an aperture 321 which may receive the opposing end 322 of an arm 110. The arm 110 then may telescope into the aperture 321, which retains the alignment of the arms 110 with each other and gear 340.

Figure 4:
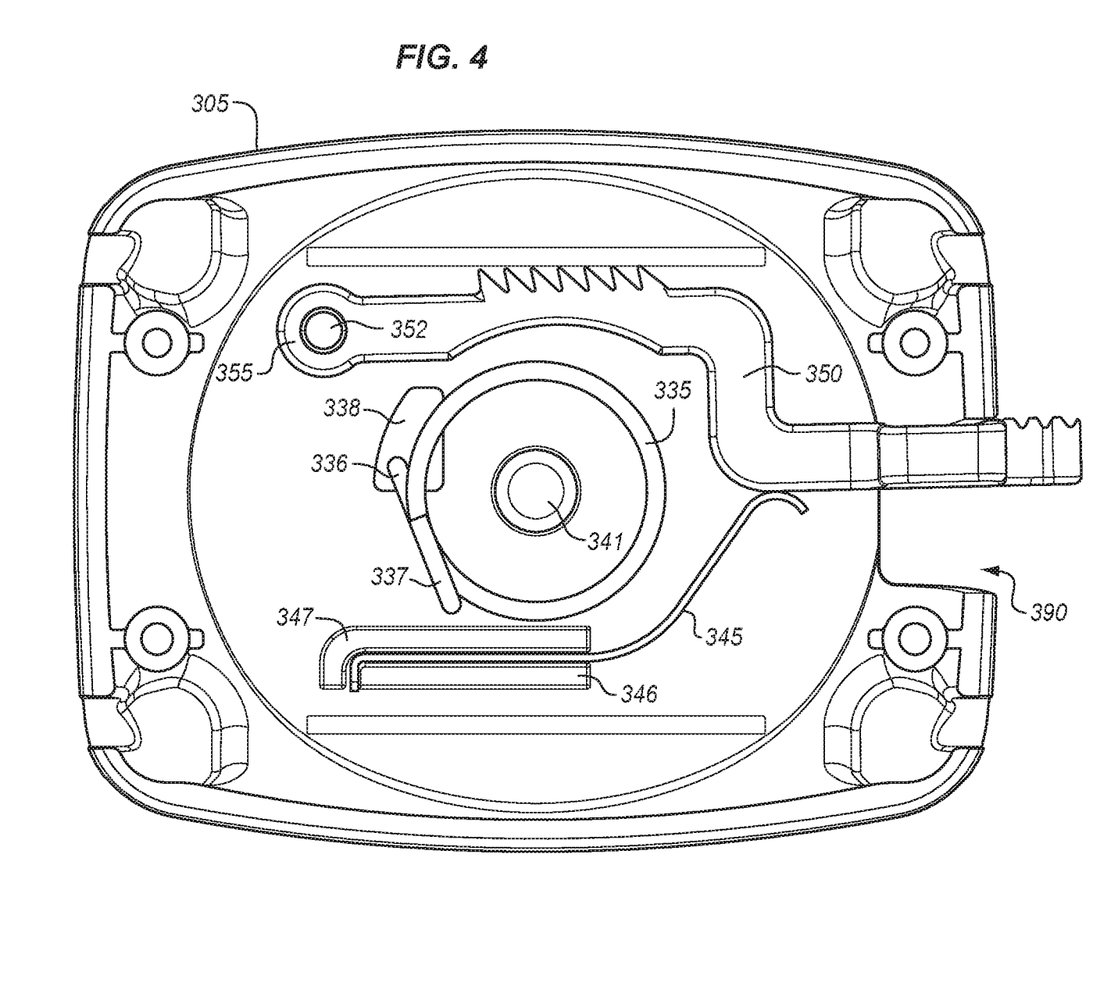
FIG. 4 shows a view of the rear body piece of the adjustable electronic device holder with quick release functions of FIG. 1.

FIG. 4 shows a view of rear body piece 350. Here, it may be seen that quick release lever 350 includes an aperture 352 that mounts on a peg 355 that protrudes from rear body piece 305. Spring 345 mounts between holding pieces 346, 347 such that tension is applied to quick release lever 350. The tension or force applied to quick release lever 350 by spring 345 should be sufficient to resist the force of spring 335 when spring 335 is tensioned by pushing arms 110 and holding pieces 120 together and turning gear 340 on spring 335. Peg 341 is also visible in this view. Gear 340 mounts on peg 341. The tip 336 of spring 335 interfaces with aperture 338 of rear body piece 305. Cutout 390 allows for quick release lever arm 350 to move up and down when depressed and released by a user.

Figure 5:
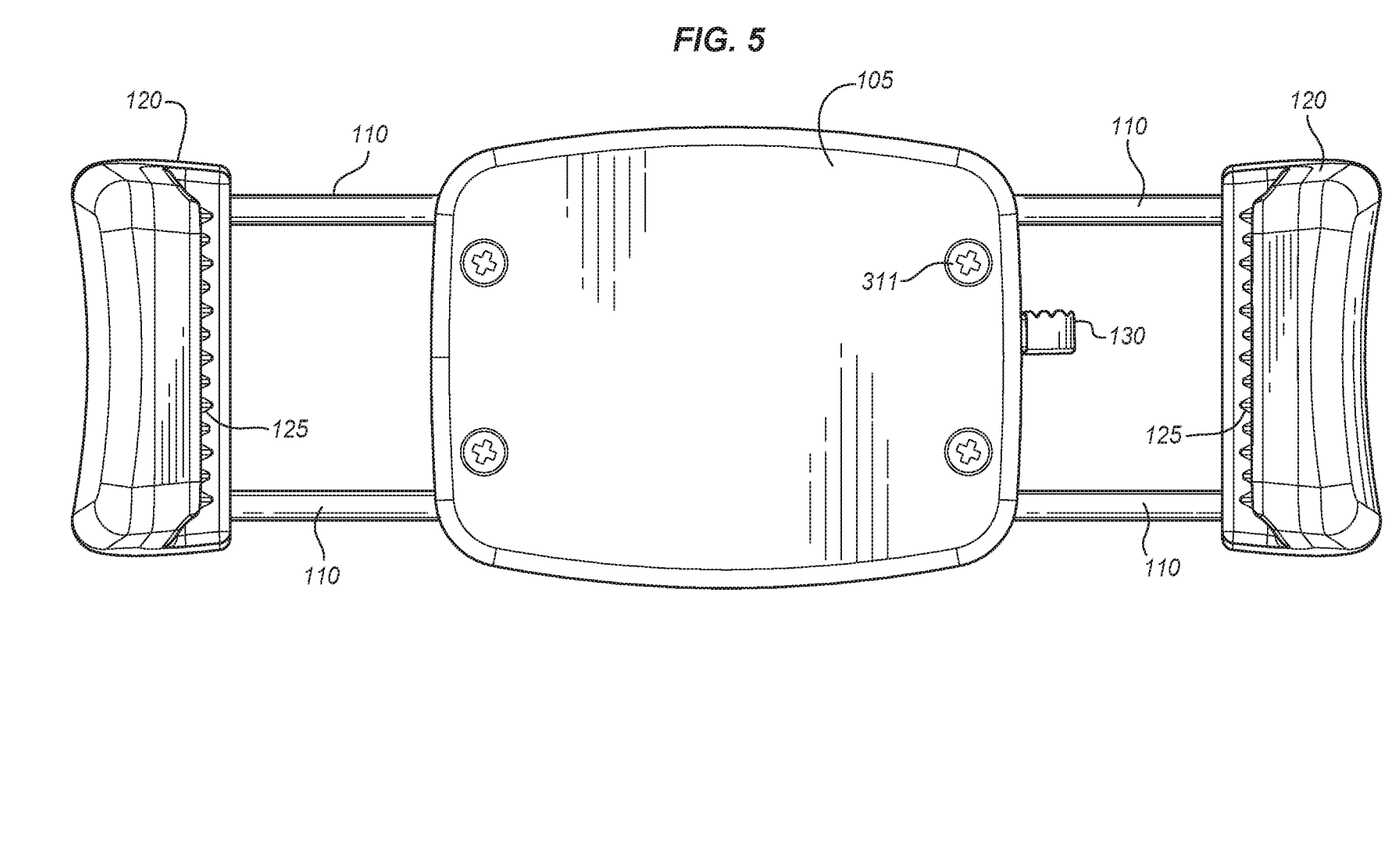
FIG. 5 shows a front view of the adjustable electronic device holder with quick release functions of FIG. 1.
Figure 6:
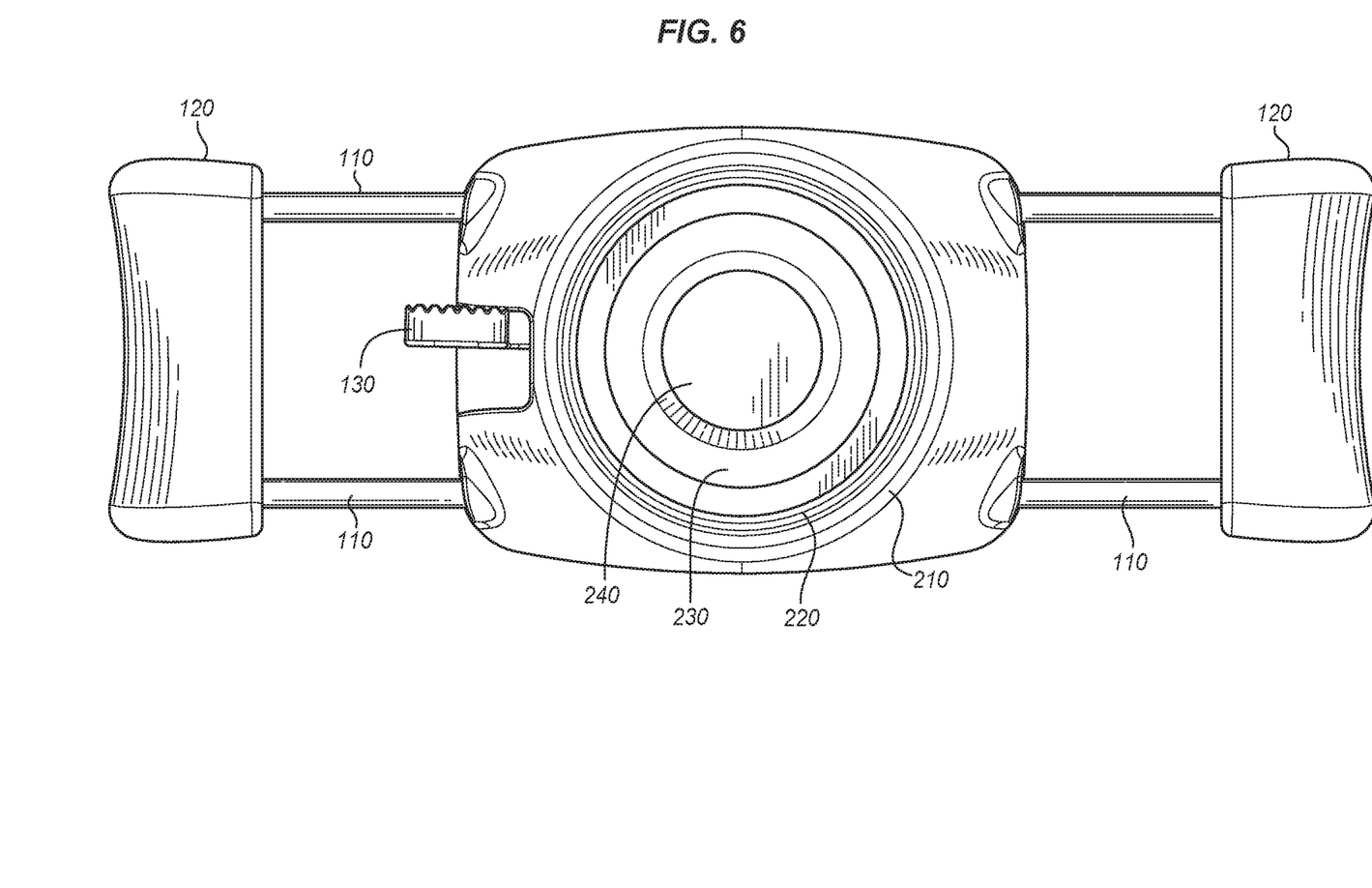
FIG. 6 shows a rear view of the adjustable electronic device holder with quick release functions of FIG. 1.
Figure 7:
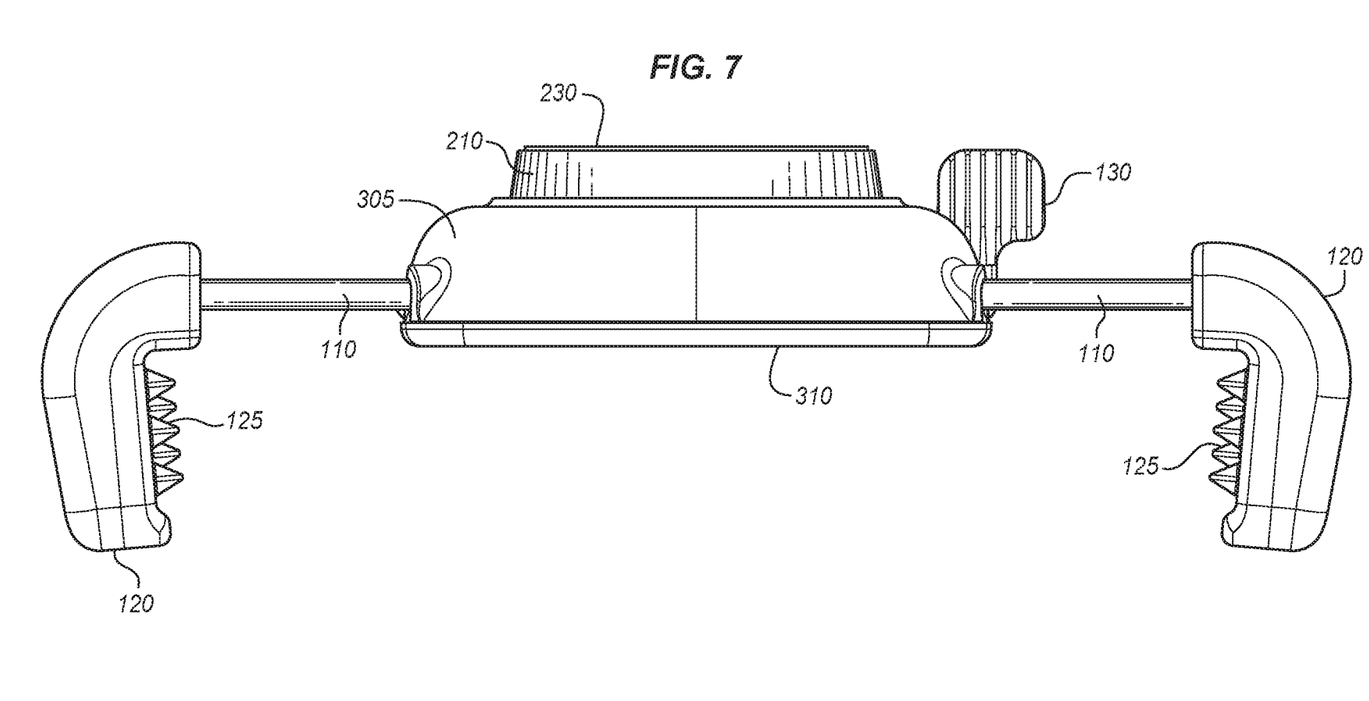
FIG. 7 shows a bottom view of the adjustable electronic device holder with quick release functions of FIG. 1.
Figure 8:
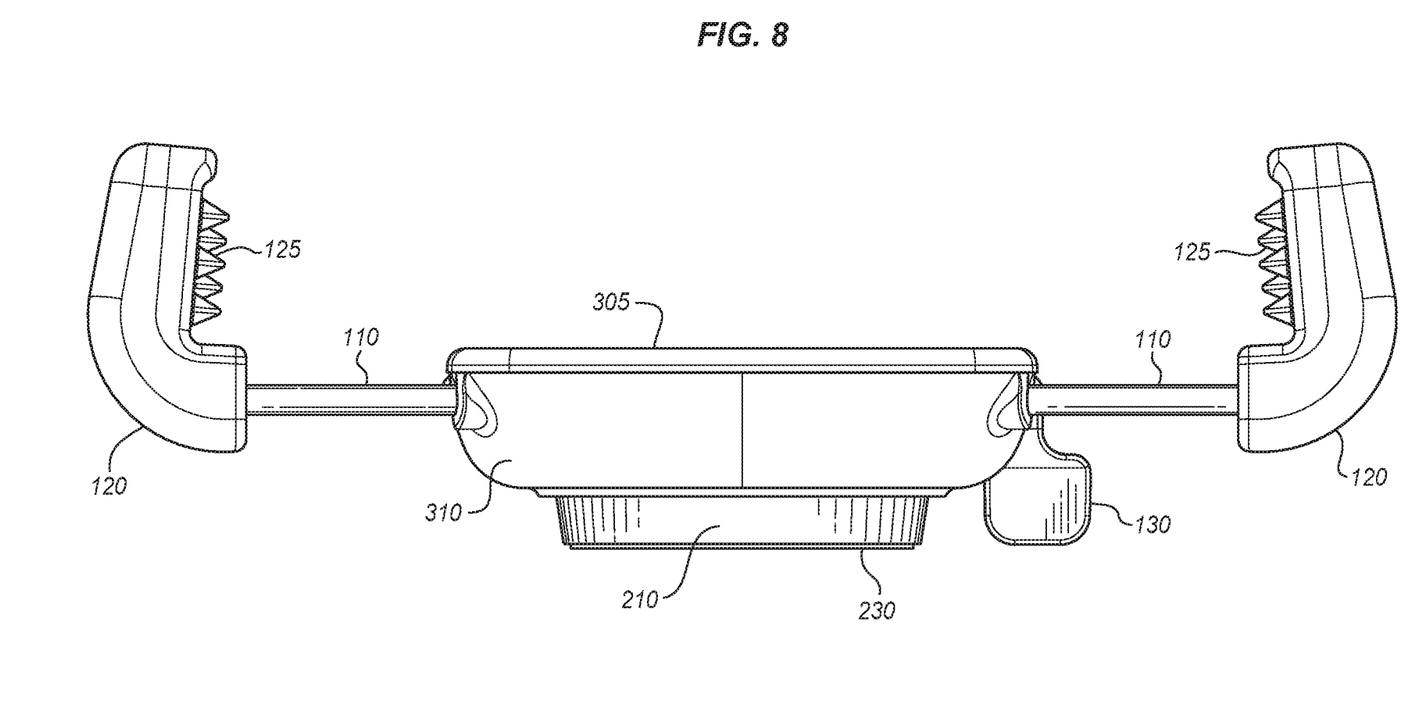
FIG. 8 shows a top view of the adjustable electronic device holder with quick release functions of FIG. 1.

FIG. 5 shows a front view of the AEDH 100. FIG. 6 shows a rear view of the AEDH 100. FIG. 7 shows a bottom view of the AEDH 100. FIG. 8 shows a top view of the AEDH 100.

Figure 9:
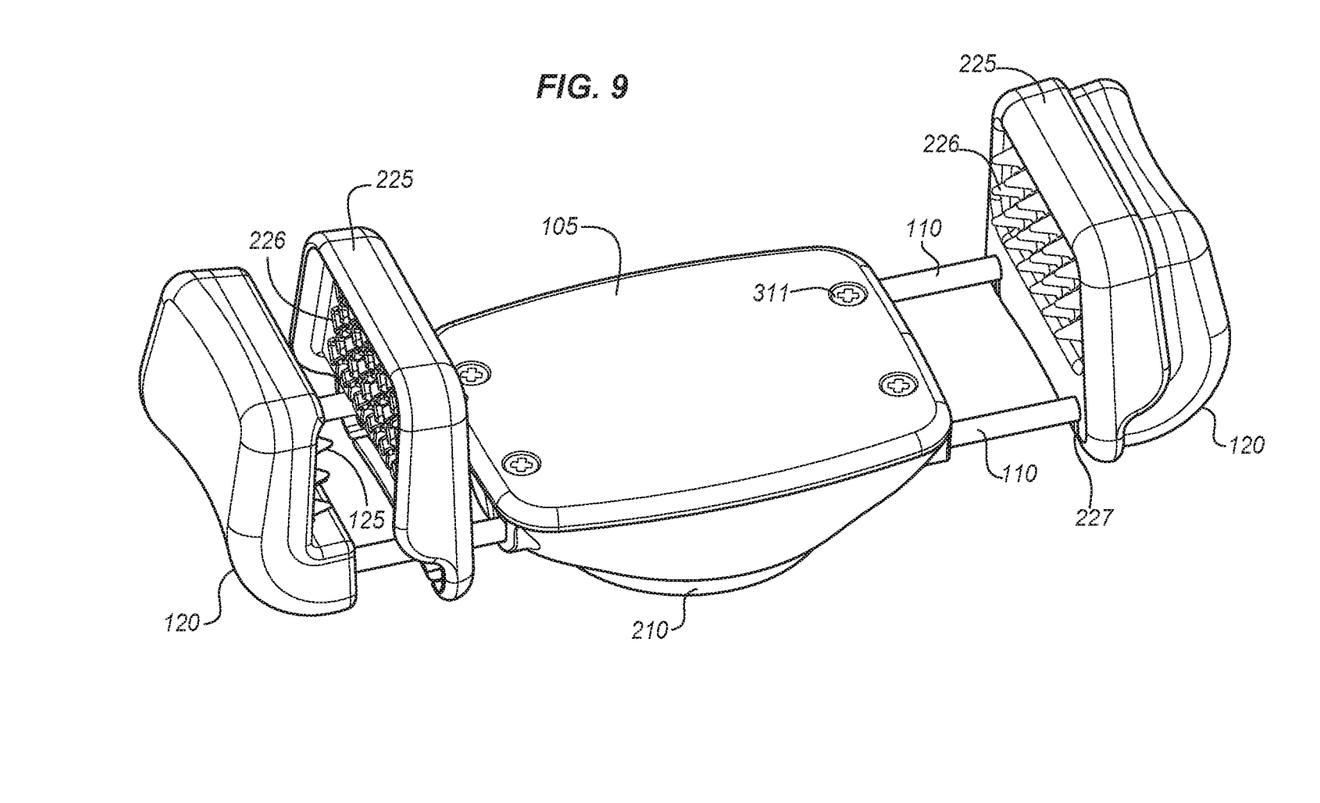
FIG. 9 shows an alternative embodiment of an adjustable electronic device holder.

FIG. 9 shows an alternative embodiment of an AEDH 100. In this embodiment, an additional spacing pad 225 has been added to the AEDH 100. These spacing pads provide for attachment of a narrow device in the AEDH. Spacing pads 225 include gripping area 226, which includes a complementary rear relief section oriented to receive gripping area 125. Typically, spacing pads 225 are composed of a softer rubberized material that can assist in gripping the device placed in it. Spacing pads 225 may additionally have breaks 227 along arms 110, such that the spacing pads 225 may be removed. Therefore, the AEDH 100 may accommodate a variety of different sizes of devices.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed is:

1. A system for holding an electronic device, the system comprising:
    a body portion, the body portion having a flat surface;
    a first holding piece and a second holding piece, each of the first and second holding pieces including a holding surface approximately perpendicular to the flat surface, the first and second holding pieces being complementarily shaped to hold the electronic device;
    an arm interconnected with the first holding piece, the arm extending into an aperture in the body portion; and
    a mechanism for holding the arm in a first fixed position such that there is a first distance between the first and second holding pieces, the mechanism further providing for orientation of the arm in a second fixed position such that there is a second distance between the first and second holding pieces, the second distance less than the first distance, the mechanism including a gear rotatably mounted on the body portion and a spring interconnected with the body portion and the gear,
    wherein the gear interacts with the arm such that, when the arm is pushed towards the body portion, the gear rotates to gather rotational energy in the spring, and the mechanism momentarily releases from the arm to allow incremental movement of the arm towards the body portion.

2. The system of claim 1, wherein the mechanism includes a quick release lever, the quick release lever holding the arm in the second fixed position and wherein when the quick release lever is depressed, the mechanism releases the arm to the first fixed position.

3. The system of claim 2, further comprising an arm end, the arm end on an end of the first arm, the arm end including a first geared portion, the first geared portion positioned to mate with a second geared portion of the quick release lever.

4. The system of claim 3, further comprising a spring arm, the spring arm oriented against the quick release lever, holding the second geared portion of the quick release lever against the first geared portion of the arm end, the quick release lever pivotally mounted on the body portion such that, when a user pushes on the quick release lever, the quick release lever releases away from the first geared portion and allows the quick release lever to move.

5. The system of claim 4, wherein the gear interacts with a third geared portion of the arm end such that, when the arm is pushed toward the body portion, the gear rotates, gathering rotational energy in the spring, and the quick release lever pushes against the spring arm, momentarily releasing the first geared portion from the second geared portion, allowing the quick release lever to ratchet.

6. The system of claim 5, further comprising a second arm, the second arm including a second arm end, the second arm end interacting with the gear with a fourth geared portion of the second arm end.

7. The system of claim 6, wherein the first arm end and the second arm end each includes an aperture complementary to receive a third arm and a fourth arm, such that the third arm slides into the aperture of the first arm end and the fourth arm slides into the aperture of the second arm end.

8. The system of claim 7, wherein the first, second, third, and fourth arms slide in and out of the body portion in a fixed plane.

9. The system of claim 7, wherein each of the first and second holding pieces includes a piece of high friction material that compresses and provides friction to the electronic device when the electronic device is held.

10. The system of claim 9, further comprising a spacer on the first and second arms adjacent to the first holding piece, the spacer including a spacer gripping surface.

11. The system of claim 9, further comprising a magnetic holder attached to the body piece.

12. The system of claim 11, wherein the magnetic holder includes a magnetic ring formed to complementarily fit to the shape of a semicircular receiver.

13. The system of claim 12, wherein the magnetic holder further includes a first piece of high friction material formed around the magnetic ring or in the center of the magnetic ring.

14. A system for holding an electronic device, the system comprising:
- a body portion, the body portion having a flat surface;
- a first holding piece and a second holding piece, each of the first and second holding pieces including a holding surface approximately perpendicular to the flat surface, the first and second holding pieces being complementarily shaped to hold the electronic device;
- a first arm interconnected with the first holding piece and a second arm interconnected with the second holding piece, the first and second arms extending into apertures in the body portion; and
- a mechanism for holding the first and second arms in a first fixed position such that there is a first distance between the first and second holding pieces, the mechanism further providing for orientation of the first and second arms in a second fixed position such that there is a second distance between the first and second holding pieces, the second distance less than the first distance, the mechanism including a gear rotatably mounted on the body portion and a spring interconnected with the body portion and the gear,
- wherein the gear interact with the first and second arm such that, when the first and second arms are pushed towards the body, the gear rotates to gather rotational energy in the spring, and the mechanism momentarily releases from at least one of the first and second arms to allow incremental movement of the first and second arms towards the body portion.

15. The system of claim 14, wherein the mechanism includes a quick release lever, the quick release lever holding the first and second arms in the second fixed position and wherein when the quick release lever is depressed, the mechanism releases the first and second arms to the first fixed position.

16. The system of claim 15, further comprising a first arm end and a second arm end, the first arm end on an end of the first arm, the second arm end on an end of the second arm, each of the first and second arm ends including a first geared portion and a second geared portion, respectively, the first geared portion positioned to mate with a second geared portion of the quick release lever.

17. The system of claim 16, further comprising a spring arm, the spring arm oriented against the quick release lever, holding the second geared portion of the quick release lever against the first geared portion of the first arm end, the quick release lever pivotally mounted on the body portion such that, when a user pushes on the quick release lever, the quick release lever releases away from the first geared portion and allows the quick release lever to move.

18. The system of claim 17, wherein the gear interacts with a third geared portion of the first arm end and a fourth geared portion of the second arm end such that, when the first and second arms are pushed toward the body portion, the gear rotates, gathering rotational energy in the spring, and the quick release lever pushes against the spring arm, momentarily releasing the first geared portion from the second geared portion, allowing the quick release lever to ratchet.

19. The system of claim 18, wherein the first arm end and the second arm end each includes an aperture complementary to receive a third arm and a fourth arm, such that the third arm slides into the aperture of the first arm end and the fourth arm slides into the aperture of the second arm end.

20. The system of claim 19, wherein the first, second, third, and fourth arms slide in and out of the body portion in a fixed plane.

21. The system of claim 19, wherein each of the first and second holding pieces includes a piece of high friction material that compresses and provides friction to the electronic device when the electronic device is held.

22. The system of claim 21, further comprising a magnetic holder attached to the body piece, wherein the magnetic holder includes a magnetic ring, formed to complementarily fit to the shape of a semicircular receiver.

23. The system of claim 22, wherein the magnetic holder further includes a first piece of high friction material formed around the magnetic ring and a second piece of high friction material formed in the center of the magnetic ring.

24. A system for holding an electronic device, the system comprising:
- a body portion having a flat surface;
- a first holding piece and a second holding piece, each of the first and second holding pieces including a holding surface approximately perpendicular to the flat surface, the first and second holding pieces being complementarily shaped to hold the electronic device;
- an arm interconnected with the first holding piece, the arm extending into an aperture in the body portion and including first and second geared portions; and
- a mechanism for holding the arm in first fixed position such that there is a first distance between the first and second holding pieces, the mechanism further providing for orientation of the arm in a second fixed position such that there is a second distance between the first and second holding pieces, the second distance less than the first, the mechanism including:
  - a release lever releasably engaging the first geared portion of the arm to releasably hold the arm in the first and second fixed positions;
  - a spring arm oriented against the release lever to bias the release lever against the first geared portion of the arm;
  - a gear rotatably mounted on the body portion and interacting with the second geared portion of the arm; and
  - a spring interconnected with the body portion and the gear;
- wherein the gear interacts with the second geared portion of the arm such that, when the arm is pushed towards the body portion, the gear rotates to gather rotational energy in the spring, and the release lever pushes against the spring arm, momentarily releasing the release lever from the first geared portion of the arm, allowing the release lever to ratchet.

* * * * *